United States Patent [19]

McConnell et al.

[11] 4,350,808

[45] Sep. 21, 1982

[54] COPOLYESTER COMPOSITIONS

[75] Inventors: Richard L. McConnell; Jimmy R. Trotter; Glenn C. Jones, all of Kingsport, Tenn.

[73] Assignee: Eastman Kodak Company, Rochester, N.Y.

[21] Appl. No.: 232,769

[22] Filed: Feb. 9, 1981

[51] Int. Cl.$^3$ .............................................. C08G 3/16
[52] U.S. Cl. .................................... 528/302; 528/272
[58] Field of Search .............................. 528/272, 302

[56] References Cited

U.S. PATENT DOCUMENTS

| | | | |
|---|---|---|---|
| 2,363,581 | 11/1944 | Frosch | 528/302 |
| 2,402,137 | 6/1946 | Hanford et al. | 260/29.6 XA |
| 2,409,683 | 10/1946 | Howk et al. | 106/10 |
| 2,433,015 | 12/1947 | Roland et al. | 260/413 HC |
| 2,585,723 | 2/1952 | Banes et al. | 260/413 HC |
| 3,049,557 | 8/1962 | Emrick | 560/105 |
| 3,057,824 | 10/1962 | Le Bras et al. | 528/302 |
| 3,091,650 | 5/1963 | Emrick et al. | 585/942 |
| 3,100,792 | 8/1963 | Emrick | 568/904 |
| 4,252,940 | 2/1981 | Sublett | 528/302 |

*Primary Examiner*—Ronald W. Griffin
*Attorney, Agent, or Firm*—John F. Stevens; Daniel B. Reece, III

[57] ABSTRACT

Disclosed are copolyesters derived from 100 mole % of a dibasic acid component, about 2–30 mole % of which is the reaction product of ethylene and at least one dialkyl ester of an aliphatic or cycloaliphatic dibasic acid, said dibasic acid containing from 3 to 22 carbon atoms and the alkyl groups of which contain from 1 to 8 carbon atoms, and 100 mole % of at least one aliphatic or alicyclic glycol having 2 to 12 carbon atoms. These polyesters have a crystalline melting point of at least 200° C. and are useful in the form of fibers, films, and molded objects.

8 Claims, No Drawings

COPOLYESTER COMPOSITIONS

TECHNICAL FIELD

This invention relates to linear polyesters having ethylene telomers derived from dialkyl esters of dibasic acids, as a part of their dibasic acid component.

Certain polyesters are known to be useful as films, fibers, or molded objects, but the high melting point of certain polyesters such as poly(ethylene terephthalate) or poly(1,4-cyclohexylenedimethylene terephthalate) is often a disadvantage in processing these materials. One way of decreasing the melting point of these polyesters is to include a comonomer into the polyester chain. It has now been found that certain ethylene telomer esters are quite useful in modifying the melting point of certain copolyesters without deleteriously affecting other desirable polymer properties.

These new copolyesters generally contain crystallizable moieties with crystalline melting points of at least 200° C. They contain at least 2 mole % of one or more ethylene telomer esters which are chemically combined in the polyester molecule. The maximum amount of ethylene telomer ester which may be used will depend on the particular glycol used in making the polyester. Generally, the maximum amount of ethylene telomer ester in the copolyesters will be about 30 mole %, such as in those polymers made from ethylene glycol or cyclohexanedimethanol. Pigments, antioxidants, and/or fillers may be used in the compositions if desired.

BACKGROUND

Patents of interest in connection with telomers include U.S. Pat. Nos. 3,049,557; 3,100,792; 3,091,650; 2,402,137; 2,433,015; 2,585,723; and 2,409,683. These patents deal with telomers per se, processes for their production, and uses of such telomers. They do not suggest use of telomers as part of the dibasic acid component of polyesters.

DISCLOSURE OF INVENTION

According to the present invention, copolyesters are provided which are useful in producing fibers, films and molded objects. The copolyesters are derived from 100 mole percent of a dibasic acid component and 100 mole percent of a glycol component.

The dibasic acid component of the copolyesters of this invention contains about 2–30 mole percent of a telomer, i.e., the reaction product of ethylene and at least one dialkyl ester of an aliphatic or cycloaliphatic dibasic acid. The dibasic acid from which the telomer is derived contains from 3 to 22 carbon atoms, and the alkyl groups contain from 1 to 8 carbon atoms each. It is preferred that the dibasic acid component contain about 3 to about 25 mole percent of the telomer.

The production of telomers by reaction of ethylene and a dialkyl ester of a dibasic acid preferably containing only carbon, hydrogen, and oxygen, is well known in the art. In preparing the telomers, the ethylene, designated as the taxogen, is polymerized in the presence of the diester, or telogen. The reaction proceeds in the presence of a compound designated as a free radical initiator. This compound, usually an organic peroxide, dissociates into radicals which act to abstract an active, or labile, hydrogen atom from the telogen. The resulting radical adds to the double bond of the taxogen thereby initiating the telomerization reaction. Thus, the telogen radical and the active hydrogen form the terminal groups on the polymeric chain. The reaction can be defined by the following equation:

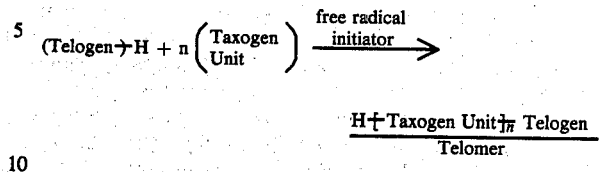

$$\text{H} \!\!-\!\!\text{[Taxogen Unit]}_{\overline{n}} \text{Telogen}$$
Telomer Telomers are not to be confused with interpolymers and/or copolymers. The fragments of the telogen monomer appear only at the terminal ends of the polymeric chain, thus forming a low molecular weight product. In contrast, the monomeric units in interpolymers and/or copolymers occur within each polymeric chain thus forming an integral part of the backbone of the polymer.

The telomers are formed by the reaction of ethylene with a dialkyl ester of a dicarboxylic acid in the presence of a free radical initiator, at temperatures between 50° and 400° C., and at pressures up to 30,000 psi.

The telogens used in preparing the telomers are dialkyl esters of dibasic acids having from 3 to 22 carbon atoms. The alkyl groups contain from 1 to 8 carbon atoms. Preferred dialkyl esters include dimethyl 1,4-cyclohexanedicarboxylate, dimethyl 1,3-cyclohexanedicarboxylate, dimethyl glutarate, dimethyl adipate, dimethyl azelate, dimethyl 1,12-dodecanedioate and the like. Although dimethyl esters are most preferred, other esters such as the ethyl, propyl and butyl are also preferred.

In the production of the telomers, temperatures of about 50° to about 400° C. are generally used, with the preferred temperature range being from about 150° to about 300° C. The temperature utilized is somewhat variable in relation to the pressure and contact time employed. Generally, very good results are obtained by maintaining the pressure at about 10 to 2000 atmospheres or higher and heating the reactants at about 160° C. for two to three hours. When low ethylene pressures are used, reaction pressure may be maintained by the use of an inert gas, such as nitrogen.

Free radical initiators which may be used in the reaction include peroxides such as diacetyl peroxide, dipropionyl peroxide, acetyl benzoyl peroxide, benzoyl peroxide, di-tert-butyl peroxide, tert.-butyl hydroperoxide, tert.-butyl perbenzoate, tert.-butyl peroxy acetate, hydrogen peroxide, and t-butyl percarbonate.

The preferred free radical initiator for use in preparing the telomers of the instant invention is di-tert.-butyl peroxide.

The telomers will vary with the reaction conditions, i.e., the amount of ethylene utilized, the amount of free radical initiator available, and variance in the temperature and pressure employed.

The polyesters of this invention contain from about 70 to about 98 mole % of one or more aromatic, cycloaliphatic, or aliphatic dibasic acids having 4 to 36 carbon atoms, and they contain one or more aliphatic or cycloaliphatic glycols having 2 to 12 carbon atoms. Suitable dibasic acids include terephthalic, isophthalic, 5-sulfoisophthalic (the sulfonic acid group is neutralized with an alkali metal), 1,4-cyclohexanedicarboxylic, 1,3-cyclohexanedicarboxylic, 1,2-cyclohexanedicarboxylic, succinic, glutaric, adipic, pimelic, suberic, azelaic, sebacic, 1,12-dodecanedioic, dimer acid, and the like. These dibasic acids may be used as the free acid or as alkyl esters in the preparation of the polyesters. In general, the polyesters will contain a major amount of terephthalic acid or cyclohexanedicarboxylic acid in order to maintain a high melting point in the polyester. Because aliphatic dibasic acids such as glutaric, adipic, pimelic, and the like provide low melting polyesters, generally only small amounts of these acids are used in the preparation of polyesters according to this invention. Useful glycols include ethylene glycol, propylene glycol, 1,3-propanediol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, and the like.

These new copolyesters are readily prepared using typical polycondensation reaction conditions. They may be prepared by either batch or continuous processes.

Typical polyesterification catalysts which may be used include titanium alkoxides, dibutyl tin dilaurate, and combinations of zinc, manganese or magnesium acetates or benzoates with antimony oxide or antimony triacetate.

Useful polymers may have inherent viscosities (I.V.) ranging from about 0.3 to about 1.6, but preferred polymers have I.V. values ranging from about 0.5 to about 1.4. These polyesters have crystalline melting points of at least 200° C.

The following examples are submitted for a better understanding of the invention.

EXAMPLE 1

To a one gallon stirred autoclave is charged 1800 g. (9 mole) dimethyl cyclohexane-1,4-dicarboxylate (cis and trans mixture) and 36 g. (0.275 mole) di-tert-butyl peroxide. The autoclave is purged with nitrogen, and the temperature is raised to 70° C. The solution is gently stirred for 30 min. to insure the reactants are well mixed. Ethylene (650 psi) is added and the temperature raised to 160° C. over a two-hour period. The ethylene pressure is maintained at 650 psi for 3 hours at 160° C. The reaction product is filtered to remove unchanged dimethyl cyclohexane-1,4-dicarboxylate. The lower boiling material is removed by distillation at a pressure of 1 mm until a base temperature of 225° C. and a head temperature of 180° C. is obtained. The remaining material (224 g.) has a number average molecular weight of 610 as determined by the boiling point elevation method.

EXAMPLE 2

To a one liter stirred autoclave is charged 451 g. (2.8 mole) dimethyl glutarate and 12.5 g. (0.085 mole) di-tert-butyl peroxide. After the autoclave is purged with nitrogen, 650 psi ethylene is added and the temperature raised to 160° C. The ethylene pressure is maintained for three hours. The lower boiling material is removed from the product by distillation at 1.2 mm until a base temperature of 230° C. and a head temperature of 187° C. is obtained. The remaining material (55 g.) has a number average molecular weight of 728 as determined by the boiling point elevation method.

EXAMPLE 3

A total of 92.15 grams (0.475 mol) of dimethyl terephthalate, 15.25 grams (0.025 mol) of dimethyl 1,4-cyclohexanedicarboxylate ethylene telomer (mol wt=610), 62.0 grams (1.0 mol) of ethylene glycol, and 100 ppm of titanium catalyst [1.64 mL of titanium isopropoxide catalyst solution in n-butanol (0.65 wt. % titanium)] are weighed into a 500 mL single-neck round bottom flask equipped with a nitrogen inlet, stirrer, vacuum outlet, and a condensing flask. The flask is heated at 200° C. in a Belmont metal bath for one hour with a nitrogen sweep over the reaction mixture. After one hour, the temperature is increased to 215° C. for one hour. When the theoretical amount of methanol has distilled from the reaction mixture, the metal bath temperature is increased to 280° C. and the pressure in the flask is reduced to about 0.1–0.5 mm of mercury. The flask is heated at 280° C. at about 0.2 mm pressure for one hour. The flask is then removed from the bath and is allowed to cool under a nitrogen atmosphere as the polyester crystallizes.

NMR analysis of the polymer indicates it to be a poly(ethylene terephthalate) type polyester containing 2 mol % of 1,4-cyclohexanedicarboxylic acid ethylene telomer.

The polymer is opaque and is a light cream color. It has an I.V. of 0.38. By DSC analysis, the polymer has a Tg of 68° C., a Tm of 249° C., and $\Delta H_f$ of 11.1 cal/g. The polymer is placed in a Tinius-Olsen Extrusion Plastometer equipped with a 0.04 inch diameter orifice at 270° C. After the polymer has melted in the plastometer, it is readily extruded into a monofilament.

A small sample (2 g) of the polymer is ground into a powder, placed in a glass tube, and heated in a heat block at 220° C. for four hours under high vacuum (<0.1 mm). The mol wt. of the polymer builds up and the sample now has an I.V. of 0.81. This material is melt pressed into a clear, tough film in a hydraulic press at 270° C.

EXAMPLE 4

A total of 92.15 grams (0.475 mol) of dimethyl terephthalate, 15.25 grams (0.025 mol) of dimethyl 1,4-cyclohexanedicarboxylate ethylene telomer (mol wt=610), 93.6 grams (0.65 mol) of 1,4-cyclohexanedimethanol (70/30 cis/trans isomer mixture), and 100 ppm of titanium catalyst [2.28 mL of titanium isopropoxide catalyst solution in n-butanol (0.65 wt % titanium)] are weighed into a 500 mL single-neck round bottom flask equipped with a nitrogen inlet, stirrer, vacuum outlet, and a condensing flask. The flask is heated at 200° C. in a Belmont metal bath for 28 minutes with a nitrogen sweep over the reaction mixture. After 28 minutes, the temperature is increased to 290° C. for 2.25 hours. When the theoretical amount of methanol has distilled from the reaction mixture, the pressure in the flask is reduced to about 0.1–0.5 mm of mercury. The flask is heated at 290° C. at about 0.2 mm pressure for 45 minutes. The flask is then removed from the bath and is allowed to cool under a nitrogen atmosphere as the copolyester crystallizes.

NMR analysis of the polymer indicates it to be a poly(1,4-cyclohexylenedimethylene terephthalate) type polyester containing 4.4 mol % of 1,4-cyclohexanedicarboxylic acid ethylene telomer. The polymer is white and it has an I.V. of 0.67. By DSC analysis, the polymer has a Tg of 80° C., a Tm of 285° C., and a $\Delta H_f$ of 6.2 cal/g. The polymer is placed in a Tinius-Olsen Extrusion Plastometer equipped with a 0.04 inch diameter orifice at 295° C. After the polymer has melted in the plastometer, it is readily extruded into a monofilament.

EXAMPLE 5

The general procedure for Example 1 is repeated except that dimethyl terephthalate, dimethyl 1,4-cyclohexanedicarboxylateethylene telomer (mol wt=480), and ethylene glycol are used to make a poly(ethylene terephthalate) copolyester containing 21 mol % of 1,4-cyclohexanedicarboxylic acid-ethylene telomer. This copolymer has an I.V. of 0.64 and a melting point of 214° C. A sample of this polymer is molded into ⅛ inch thick tensile specimens in a Newbury Injection Molding Machine at 235° C. The specimens are flexible and tough.

EXAMPLE 6

The general procedure of Example 2 is repeated except that dimethyl terephthalate, dimethyl glutarate-ethylene telomer (mol wt=728), and 1,4-cyclohexanedimethanol are used to make a poly(1,4-cyclohexylenedimethylene terephthalate) copolyester containing 7 mol % of the glutaric acid-ethylene telomer. This copolymer has an I.V. of 0.82 and a DSC melting point of 276° C. A sample of the polymer is spun into a textile fiber using a spinneret with 10 holes (0.3 mm diameter holes). The melt temperature during the spinning operation is 285° C., the spinning rate is 5 g/minute and the fibers are wound up at 1600 feet/minute. The fibers are drafted (3/1 ratio) at 150° C. in superheated steam to provide fibers with a tenacity of 2.5 g/denier and an elongation of 32%. In spinning unmodified poly(1,4-cyclohexylenedimethylene terephthalate) polymer (I.V. 0.78), a melt temperature of 300° C. is required.

EXAMPLE 7

The general procedure of Example 1 is repeated except that dimethyl terephthalate, dimethyl sebacate-ethylene telomer (mol wt 790) and 1,4-butanediol are used to make a copolyester containing 5 mol % of sebacic acid-ethylene telomer. The copolyester has an I.V. of 0.71 and a DSC melting point of 215° C. A sample of the polymer is melt pressed at 230° C. in a hydraulic press to provide an opaque film.

EXAMPLE 8

The general procedure of Example 1 is repeated except that dimethyl terephthalate, dimethyl azelate-ethylene telomer (mol wt 664), 1,4-butanediol, and 1,6-hexanediol are used to make a copolyester containing 96 mol % terephthalic acid, 4 mol % azelaic acid-ethylene telomer, 93 mol % 1,4-butanediol, and 7 mol % 1,6-hexanediol. The copolymer has an I.V. of 0.76 and a DSC melting point of 203° C. A sample of the polymer is melt pressed into a hazy, tough film in a hydraulic press at 230° C.

Unless otherwise specified, all parts, percentages, ratios, etc., are by weight.

The term "polyester" is used herein in a generic sense to include copolyesters.

Although not required in the practice of this invention, small amounts of stabilizers, pigments, colorants, anticaking agents, fluorescent agents or other additives normally used in fibers or films may be used if desired.

Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

Melting point (Tm) is obtained using a Differential Scanning Calorimeter.

The "heat of fusion", $\Delta H_f$, of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

The invention has been described in detail with particular reference to preferred embodiments thereof, but it will be understood that variations and modifications can be effected within the spirit and scope of the invention.

We claim:

1. Copolyester derived from
   (a) 100 mole % of a dibasic acid component, from about 2 mole % to about 30 mole % of which is an ethylene telomer ester of ethylene and at least one dialkyl ester of an aliphatic or cycloaliphatic dibasic acid, said dibasic acid containing from 3 to 22 carbon atoms and the alkyl groups of which contain from 1 to 8 carbon atoms, and
   (b) 100 mole % of at least one aliphatic or alicyclic glycol having 2 to 12 carbon atoms,
   said copolyester having a crystalline melting point of at least 200° C.

2. Copolyester according to claim 1 comprising from about 3 mole % to about 25 mole % of said reaction product and from about 97% to about 75 mole % of an aromatic, aliphatic or cycloaliphatic dibasic acid having from 4 to 36 carbon atoms.

3. Copolyester according to claim 1 wherein the I.V. is from about 0.3 to about 1.6.

4. Copolyester derived from
   (a) 100 mole % of a dibasic acid component, from about 2 to about 30 mole % of which is an ethylene telomer ester of ethylene and at least one dialkyl ester of an aliphatic or cycloaliphatic dibasic acid, said dibasic acid containing from 3 to 22 carbon atoms and the alkyl groups of which contain from 1 to 8 carbon atoms, and from about 98 to about 70 mole % of which is an aromatic, aliphatic or cycloaliphatic dibasic acid having from 4 to 36 carbon atoms, and
   (b) 100 mole % of at least one aliphatic or alicyclic glycol having 2 to 12 carbon atoms,
   said copolyester having an I.V. of from about 0.5 to about 1.4, and a crystalline melting point of at least 200° C.

5. A molded article of manufacture comprising the copolyester of claim 1.

6. A molded article of manufacture comprising the copolyester of claim 4.

7. A fiber or film comprising the copolyester of claim 1.

8. A fiber or film comprising the copolyester of claim 1.